(12) United States Patent
Park et al.

(10) Patent No.: US 12,136,717 B2
(45) Date of Patent: Nov. 5, 2024

(54) BATTERY MODULE, METHOD OF MANUFACTURING SAME, AND BATTERY PACK COMPRISING SAME

(71) Applicant: LG Energy Solution, Ltd., Seoul (KR)

(72) Inventors: Jinwoo Park, Daejeon (KR); Tae Geun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 507 days.

(21) Appl. No.: 17/433,691

(22) PCT Filed: Jun. 26, 2020

(86) PCT No.: PCT/KR2020/008361
§ 371 (c)(1),
(2) Date: Aug. 25, 2021

(87) PCT Pub. No.: WO2021/010615
PCT Pub. Date: Jan. 21, 2021

(65) Prior Publication Data
US 2022/0166084 A1   May 26, 2022

(30) Foreign Application Priority Data

Jul. 18, 2019 (KR) .................. 10-2019-0087073

(51) Int. Cl.
*H01M 10/653* (2014.01)
*H01M 10/647* (2014.01)
*H01M 50/211* (2021.01)
*H01M 50/271* (2021.01)

(52) U.S. Cl.
CPC ....... *H01M 10/653* (2015.04); *H01M 10/647* (2015.04); *H01M 50/211* (2021.01); *H01M 50/271* (2021.01); *H01M 2220/20* (2013.01)

(58) Field of Classification Search
None
See application file for complete search history.

(56) References Cited

U.S. PATENT DOCUMENTS 5,298,347 A    3/1994   Aksoy et al.
5,432,017 A    7/1995   Hassemer et al.
(Continued)

FOREIGN PATENT DOCUMENTS

CN    1114844 A      1/1996
CN    107464902 A   12/2017
(Continued)

OTHER PUBLICATIONS

Extended European Search Report including Written Opinion for Application No. 20840290.9 dated Mar. 18, 2022, pp. 1-7.
(Continued)

*Primary Examiner* — Carlos Barcena
(74) *Attorney, Agent, or Firm* — Lerner David LLP (57) ABSTRACT

A battery module according to an embodiment of the present disclosure comprises: a battery cell stack in which a plurality of battery cells are stacked, a U-shaped frame accommodating the battery cell stack and having an opened upper portion, an upper plate covering the battery cell stack on the opened upper portion of the U-shaped frame, a thermally conductive layer located between the U-shaped frame and the battery cell stack, and a structural adhesive layer located between the upper plate and the battery cell stack.

13 Claims, 10 Drawing Sheets

(56) References Cited

U.S. PATENT DOCUMENTS

| | | |
|---|---|---|
| 10,497,910 B2 | 12/2019 | Lee et al. |
| 10,615,470 B2 | 4/2020 | Park et al. |
| 2011/0143193 A1* | 6/2011 | Ahn .................... H01M 50/103 |
| | | 429/176 |
| 2011/0300428 A1 | 12/2011 | Sohn |
| 2014/0023906 A1 | 1/2014 | Hashimoto et al. |
| 2015/0064542 A1 | 3/2015 | Noh et al. |
| 2018/0145294 A1* | 5/2018 | Choi .................... H01M 50/293 |
| 2018/0175468 A1 | 6/2018 | Shin et al. |
| 2018/0183119 A1 | 6/2018 | Ju et al. |
| 2019/0131596 A1 | 5/2019 | Yang et al. |
| 2019/0198951 A1 | 6/2019 | Tong et al. |
| 2019/0198952 A1 | 6/2019 | Choi et al. |
| 2020/0014005 A1 | 1/2020 | Lee et al. |
| 2020/0185797 A1 | 6/2020 | Park et al. |
| 2020/0203698 A1 | 6/2020 | Jin et al. |
| 2020/0350645 A1 | 11/2020 | Ju et al. |
| 2020/0381691 A1 | 12/2020 | Chi et al. |
| 2022/0052391 A1 | 2/2022 | Kim et al. |

FOREIGN PATENT DOCUMENTS

| | | |
|---|---|---|
| CN | 107771366 A | 3/2018 |
| CN | 109088020 A | 12/2018 |
| EP | 3876303 A1 | 9/2021 |
| EP | 3916839 A1 | 12/2021 |
| EP | 3923370 A1 | 12/2021 |
| JP | H08-504053 A | 4/1996 |
| JP | H11111250 A | 4/1999 |
| KR | 100148202 B1 | 9/1998 |
| KR | 20110132793 A | 12/2011 |
| KR | 20150026609 A | 3/2015 |
| KR | 20160016543 A | 2/2016 |
| KR | 20180074133 A | 7/2018 |
| KR | 101900998 B1 | 9/2018 |
| KR | 20180099439 A | 9/2018 |
| KR | 20190030673 A | 3/2019 |
| KR | 20190078521 A | 7/2019 |
| WO | 9508848 A1 | 3/1995 |
| WO | 2011-152668 A2 | 12/2011 |
| WO | 2012133708 A1 | 10/2012 |
| WO | 2018009003 A1 | 1/2018 |
| WO | 2018040902 A1 | 3/2018 |
| WO | 2018-216872 A1 | 11/2018 |
| WO | 2019-098588 A1 | 5/2019 |

OTHER PUBLICATIONS

International Search Report for Application No. PCT/KR2020/008361 mailed Oct. 12, 2020, pp. 1-4.

* cited by examiner

[FIG. 1]

PRIOR ART

BATTERY MODULE, METHOD OF MANUFACTURING SAME, AND BATTERY PACK COMPRISING SAME

CROSS-REFERENCE TO RELATED APPLICATIONS

This application is a national phase entry under 35 U.S.C. § 371 of PCT/KR2020/008361 filed on Jun. 26, 2020 and claims the benefit of Korean Patent Application No. 10-2019-0087073 filed on Jul. 18, 2019 with the Korean Intellectual Property Office, the disclosures of which are each incorporated herein by reference in their entirety.

TECHNICAL FIELD

The present disclosure relates to a battery module, a method of manufacturing the same, and a battery pack, and more particularly to a battery module that improves space utilization rate and increases processability, a method of manufacturing the same, and a battery pack.

BACKGROUND ART

Secondary batteries, which are easily applied to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Preferably, the middle- or large-sized battery module is manufactured so as to have as small a size and weight as possible. Consequently, a prismatic battery or a pouch-shaped battery, which can be stacked with high integration and has a small weight to capacity ratio, is usually used as a battery cell of the middle- or large-sized battery module. Meanwhile, in order to protect the cell stack from external shock, heat, or vibration, the battery module may include a frame member whose front and back surfaces are opened so as to accommodate the battery cell stack in an internal space.

Figure 1:
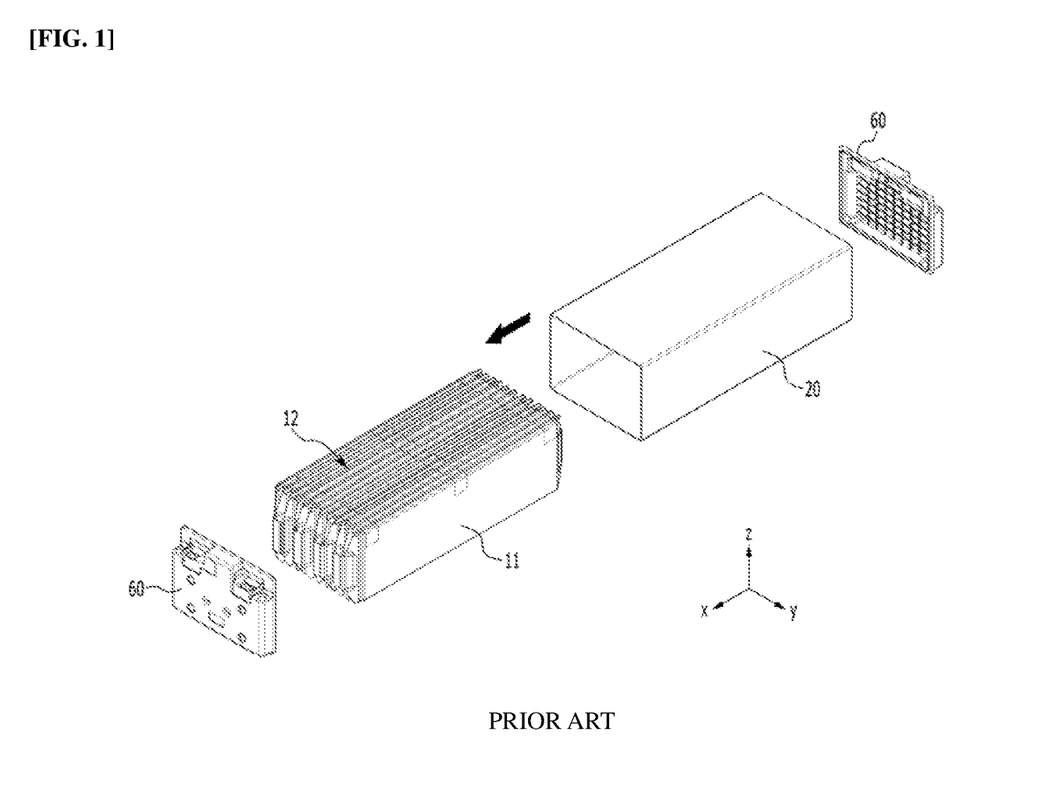
FIG. 1 is an exploded perspective view showing a battery module having a mono frame of the prior art.

FIG. 1 is a perspective view showing a battery module having a mono frame of the prior art.

Referring to FIG. 1, the battery module may include a battery cell stack 12 formed by laminating a plurality of battery cells 11, a mono frame 20 whose front and rear surfaces are opened to cover the battery cell stack 12, and end plates 60 covering the front and rear surfaces of the mono frame 20. In order to form such a battery module, it is necessary to horizontally assembly such that the battery cell stack 12 is inserted into the opened front or rear surfaces of the mono frame 20 along the X-axis direction as shown by the arrow in FIG. 1. However, in order to stabilize such a horizontal assembly, sufficient clearance must be secured between the battery cell stack 12 and the mono frame 20. Herein, the clearance refers to a gap generated by fitting or the like. When the clearance is small, it may lead to a damage of components in the process of the horizontal assembly. Therefore, a height of the mono frame 20 should be designed to be larger in consideration of a maximum height of the battery cell stack 12 and an assembly clearance in the inserting process, which may result in occurrence of an unnecessarily wasted space.

Further, a thermally conductive resin may be injected between the battery cell stack 12 and the mono frame 20 to form a thermally conductive resin layer, and the thermally conductive resin layer can serve to transfer a thermal generated from the battery cell stack 12 to a bottom of the battery module. In addition, as the thermally conductive resin layer has an adhesive strength, it is possible to prevent the battery cells 11 from moving inside the battery module due to an external vibration and shock.

However, during the process of injecting the thermally conductive resin, the thermally conductive resin may be injected in excess than the intended quantity due to the clearance of the components in the battery module. As a result, there is a disadvantage that it is difficult to identify an injection amount and a coating state of the thermally conductive resin.

DETAILED DESCRIPTION OF THE INVENTION

Technical Problem

It is an object of the present disclosure to provide a battery module that improves space utilization rate and improves processability by modifying a structure of a frame member surrounding a battery cell stack, and changing an adhesive manner between the battery cell stack and the frame member; a method of manufacturing such a battery module; and a battery pack.

However, the problem to be solved by embodiments of the present disclosure is not limited to the above-described problems, and can be variously expanded within the scope of the technical idea included in the present disclosure.

Technical Solution

A battery module according to an embodiment of the present disclosure comprises: a battery cell stack in which a plurality of battery cells are stacked, a U-shaped frame accommodating the battery cell stack and having an opened upper portion, an upper plate covering the battery cell stack on the opened upper portion of the U-shaped frame, a thermally conductive layer located between the U-shaped frame and the battery cell stack, and a structural adhesive layer located between the upper plate and the battery cell stack.

The U-shaped frame includes a bottom portion and two side surface portions facing each other, the bottom portion having two ends based on the longitudinal direction and includes a first part and a second part, the first part being located at at least one of the two ends and the second part being located inside the first part relative to the two ends, and a thickness of the first part being thinner than that of the second part.

The thermally conductive layer may be formed of a silicon-based thermally conductive paste, a liquid heat radiation material, or a thermally conductive compression pad.

The battery module further includes a busbar frame connected to the battery cell stack, wherein the U-shaped frame is opened at both sides opposite to each other based on a direction in which electrode leads of the battery cell stack protrude, and the busbar frame is connected to the battery cell stack at the opened sides of the U-shaped frame, and may include a main frame arranged perpendicular to a direction in which the electrode leads protrude and a bent portion extending from a lower portion of the main frame.

The bent portion may be located on the first part of the bottom portion.

The total thickness of the bent portion and the first part may be thinner than the thickness of the second part.

The battery cell may include a protrusion part formed in a width direction, wherein the protrusion part may be located on the bent portion.

A lower surface of the battery cell stack perpendicular to a stacked direction of the plurality of battery cells may be mounted on a bottom portion of the U-shaped frame.

The battery module further comprises an end plate coupled to each opened side of the U-shaped frame, and the opened both sides of the U-shaped frame may face each other based on a direction in which the electrode leads of the battery cell stack protrude.

The structural adhesive layer may be formed of an epoxy-based material.

A battery pack according to another embodiment of the present disclosure comprises the battery module described above.

A method of manufacturing a battery module according to another embodiment of the present disclosure includes the steps of: forming a thermally conductive layer on a bottom portion of a U-shaped frame having an opened upper portion, mounting a battery cell stack such that it is accommodated into the U-shaped frame on the thermally conductive layer, applying a structural adhesive layer onto the battery cell stack, mounting an upper plate such that it covers the battery cell stack on the opened upper portion of the U-shaped frame, and coupling the upper plate and the U-shaped frame, wherein the battery cell stack is joined to the upper plate by the structural adhesive layer.

The method of manufacturing the battery module further includes coupling an end plate to each opened sides of the U-shaped frame, wherein the battery cell stack can be mounted on the bottom portion of the U-shaped frame while being moved along a direction perpendicular to the bottom portion of the U-shaped frame.

The method of manufacturing the battery module may further includes connecting the battery cell stack and a busbar frame while the busbar frame is moved in a direction opposite to the direction in which electrode leads of the battery cells included in the battery cell stack protrude, before the battery cell stack is mounted on the bottom portion of the U-shaped frame.

Advantageous Effects

According to embodiments, a U-shaped frame is implemented so that a clearance between a battery cell stack and the frame is reduced compared to the prior art, thereby improving a space utilization rate.

Further, it is possible to eliminate the use of a protective covers necessary for preventing a damage during assembly.

Further, a gap between the battery cell stack and the U-shaped frame can be reduced by processing an edge of a bottom portion of the U-shaped frame, thereby improving the space utilization in a height direction.

Further, a thermally conductive compression pad can be applied between the battery cell stack and the frame member to improve production processability, and accurate heat transfer performance can be secured by contacting into a desired area.

Further, a type and amount of an adhesive can be optimized by using a structural adhesive in an application manner rather than an injection solution.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or above a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Figure 2:
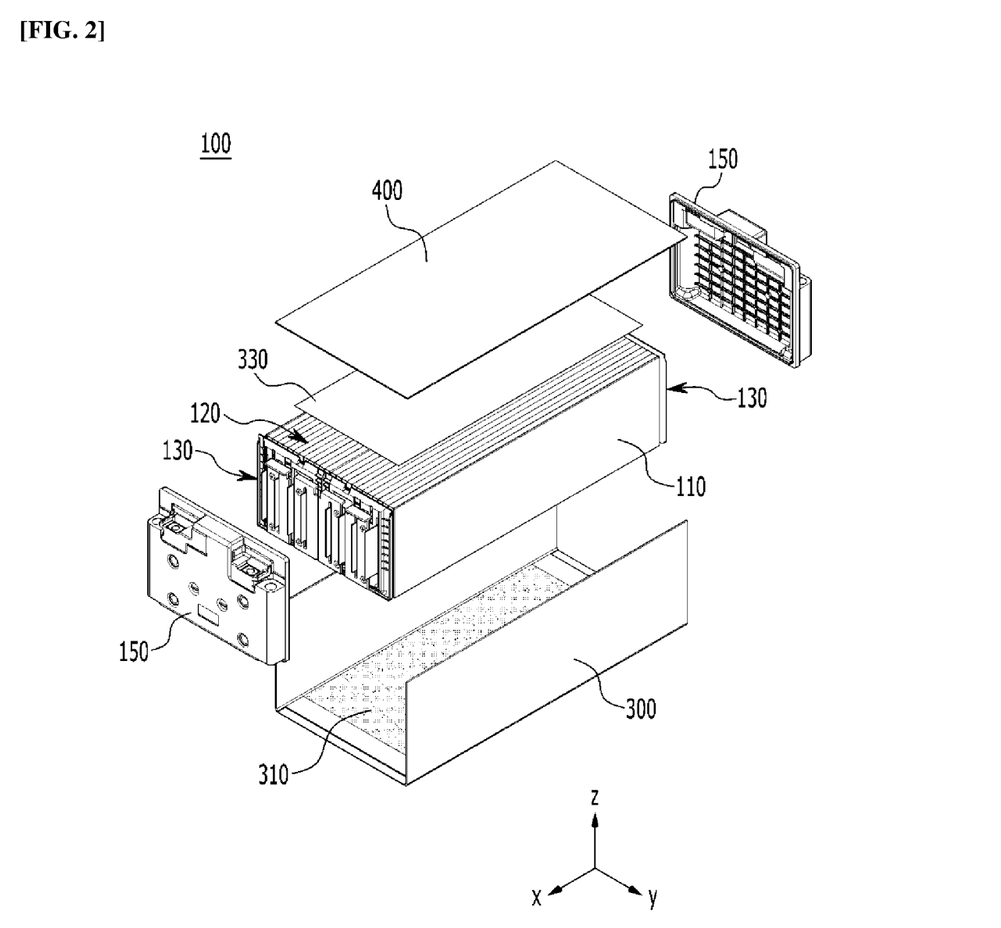
FIG. 2 is an exploded perspective view showing a battery module according to an embodiment of the present disclosure.
Figure 3:
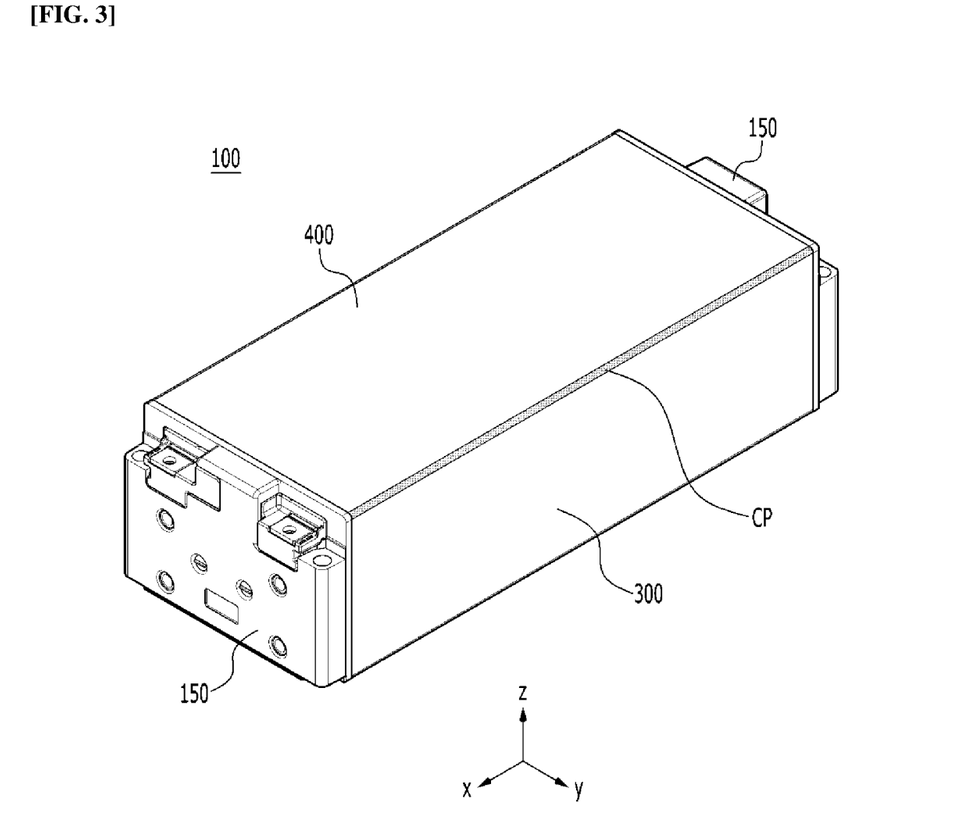
FIG. 3 is a perspective view showing a state in which elements of the battery module of FIG. 2 are coupled.
Figure 4:
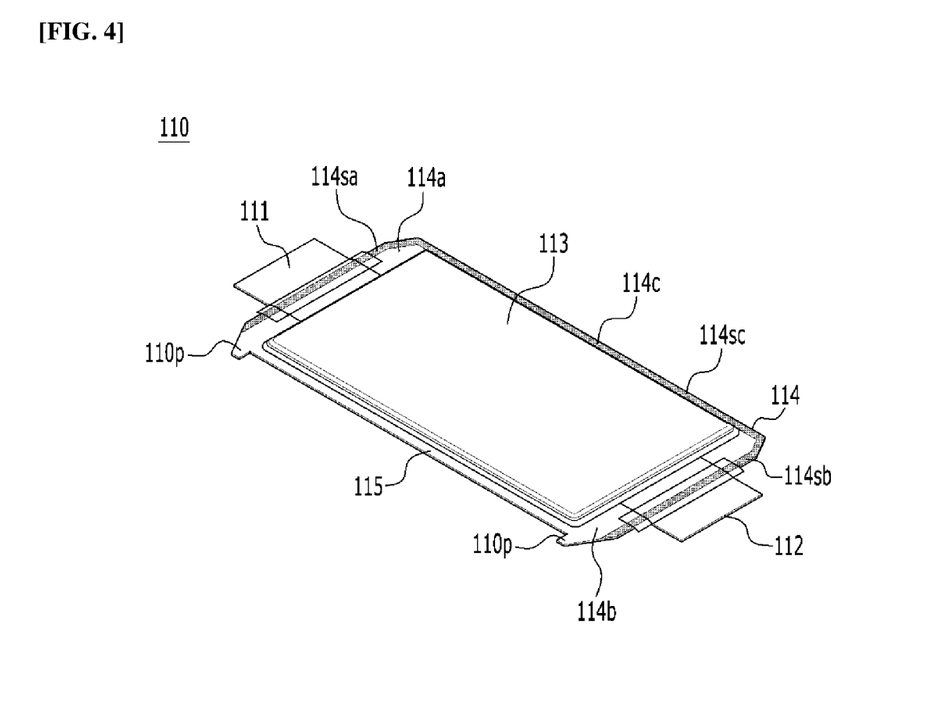
FIG. 4 is a perspective view showing one battery cell included in the battery cell stack of FIG. 2.

FIG. 2 is an exploded perspective view showing a battery module according to an embodiment of the present disclosure. FIG. 3 is a perspective view showing a state in which elements of the battery module of FIG. 2 are coupled. FIG. 4 is a perspective view showing one battery cell included in the battery cell stack of FIG. 2.

Referring to FIGS. 2 and 3, the battery module 100 according to the present embodiment includes a battery cell stack 120 including a plurality of battery cells 110, a U-shaped frame 300 having opened upper, front and rear surfaces, an upper plate 400 covering an upper portion of the battery cell stack 120, end plates 150 located at the front and rear surfaces of the battery cell stack 120, respectively, and a busbar frame 130 located between the battery cell stack 120 and the end plates 150.

When the opened both sides of the U-shaped frame 300 are referred to as a first side and a second side, respectively, the U-shaped frame 300 is configured as a structure of a plate shape bent to continuously surround the front, lower and rear surfaces adjacent to each other among the remaining outer surfaces except for the surfaces of the battery cell stack 120 corresponding to the first side and the second side. An upper surface corresponding to the lower surface of the U-shaped frame 300 is opened.

The upper plate 400 is configured as a structure of a single plate shape that covers the remaining upper surface except for the front, lower and rear surfaces that are surrounded by the U-shaped frame 300. The U-shaped frame 300 and the upper plate 400 may form a structure that surrounds the battery cell stack 120 by coupling contact areas of corner portions corresponding to each other with a welding or the like. That is, the U-shaped frame 300 and the upper plate 400 may implement a frame member by creating a coupling portion (CP) in which the corner portions corresponding to each other are formed with a coupling manner such as the welding.

The battery module 100 according to the present embodiment comprises a thermally conductive layer 310 located between the U-shaped frame 300 and the battery cell stack 120, and a structural adhesive layer 330 located between the upper plate 400 and the battery cell stack 120. The structural adhesive layer 330 may include an epoxy-based material. A detailed explanation thereof will be described later.

The battery cell stack 120 includes a plurality of battery cells 110 stacked in one direction, and the plurality of battery cells 110 may be stacked in the Y-axis direction as shown in FIG. 2. The battery cell 110 is preferably a pouch-typed battery cell. For example, with reference to FIG. 4, the battery cell 110 according to the present embodiment has a structure in which two electrode leads 111 and 112 face each other and protrude from one end 114a and the other end 114b of a battery body 113. The battery cell 110 may be manufactured by joining both ends 114a and 114b of a battery case 114 and one side surfaces 114c connecting them in a state in which the electrode assembly (not shown) is accommodated in the battery case 114. In other words, the battery cell 110 according to the present embodiment has a total of three sealing parts (114sa, 114sb, 114sc), wherein the sealing parts (114sa, 114sb, 114sc) are in a structure that is sealed with a manner such as a thermal fusion, and the remaining other side part may be formed of a connecting portion 115. A distance between both ends 114a and 114b of the battery case 114 is defined as a longitudinal direction of the battery cell 110, and a distance between the one side surface 114c and the connecting portion 115 that connect both ends 114a and 114b of the battery case 114 is defined as a width direction of the battery cell 110.

The connecting portion 115 is an area extending long along one periphery of the battery cell 110, and a protrusion part 110p of the battery cell 110 may be formed at an end of the connecting portion 115. The protrusion part 110p may be formed on at least one of both the ends of the connecting portion 115 and may protrude in a direction perpendicular to the direction in which the connecting portion 115 extends. The protrusion part 110p may be located between one of the sealing parts 114sa and 114sb of both the ends 114a and 114b of the battery case 114, and the connecting portion 115.

The battery case 114 is generally formed of a laminate structure of a resin layer/metallic thin film layer/resin layer. For example, a surface of the battery case formed of an O(oriented)-nylon layer tends to slide easily by an external impact, in case a plurality of battery cells are laminated to form a medium or large battery module. Therefore, in order to prevent this sliding and maintain a stable laminated structure of the battery cells, the battery cell stack 120 can be formed by attaching an adhesive member, for example, a sticky adhesive such as a double-sided tape or a chemical adhesive bonded by a chemical reaction upon adhesion, to the surface of the battery case. In the present embodiment, the battery cell stack 120 is stacked in a Y-axis direction and accommodated into the U-shaped frame 300 in a Z-axis direction, and then can be cooled by a thermally conductive resin layer to be described later. As a comparative example to this, there is a case in which the battery cells are formed as cartridge-shaped components so that fixing between the battery cells is made by assembling the battery module frame. In this comparative example, due to the presence of the cartridge-shaped components, the cooling action may be little or be proceeded in a surface direction of the battery cells, whereby the cooling does not work well toward a height of the battery module.

Widths of the side surface portions 300b of the U-shaped frame 300 and the upper plate 400 according to the present embodiment may be the same. In other words, a corner portion that meet along an X-axis direction of the upper plate 400 and an X-axis direction of the side surface portions 300b of the U-shaped frame 300 may be coupled by a manner such as the welding.

Figure 5:
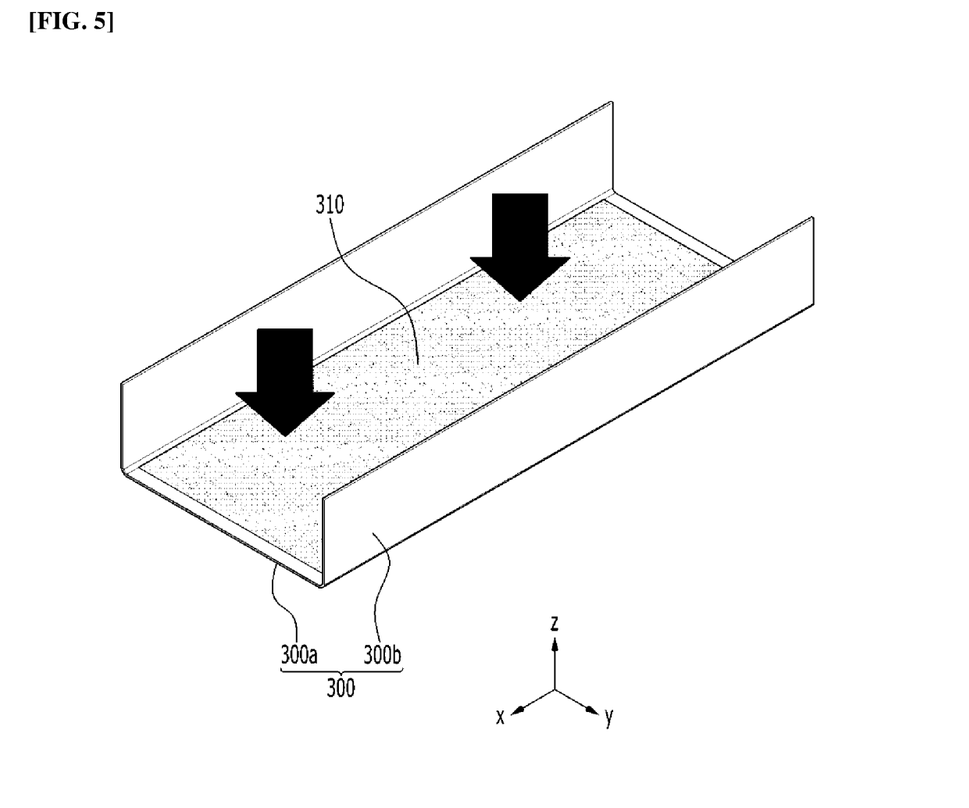
FIG. 5 is a perspective view showing a U-shaped frame in the battery module of FIG. 2.

FIG. 5 is a perspective view showing a U-shaped frame in the battery module of FIG. 2.

Referring to FIG. 5, the U-shaped frame 300 according to the present embodiment includes a bottom portion 300a and two side surface portions 300b facing each other. Before the battery cell stack 120 described in FIG. 2 is mounted on the bottom portion 300a of the U-shaped frame 300, a thermally conductive layer 310 may be formed on the bottom portion 300a of the U-shaped frame 300. The thermally conductive layer 310 may transfer a thermal generated from the battery cell 110 to the outside of the battery module 100. The thermally conductive layer 310 according to the present embodiment may be formed of a silicon-based thermally conductive paste having a low adhesive performance, a liquid heat radiation material applied to an immersion cooling, or a thermally conductive compression pad. The thermally conductive layer 310 has a lower adhesive strength than the structural adhesive layer 330 described above.

The thermally conductive compression pad can be applied between the battery cell stack 120 and the bottom portion of the U-shaped frame 300 to improve production processability, and the targets to be contacted can make contact with each other in a desired area to secure accurate heat transfer performance. By using the thermally conductive resin having the adhesive strength as well as the thermally conductive function in the prior art, it was possible to prevent the battery cell 110 from moving inside the battery module 100 due to an external vibration and impact. However, in this case, as urethane and epoxy-based products with a high adhesive performance must be used, there was a limitation in the product family of the thermally conductive resins that can be employed, which leaded to difficulties in productivity and quality control.

The thermally conductive layer 310 is located between the bottom portion 300a of the U-shaped frame 300 and the battery cell stack 120. The thermally conductive layer 310 may serve to transfer a thermal generated from the battery cell 110 to a bottom of the battery module 100. In this case, since the thermally conductive layer 310 has not strong adhesive strength, it may not be sufficient to fix the battery cell stack 120.

Figure 6:
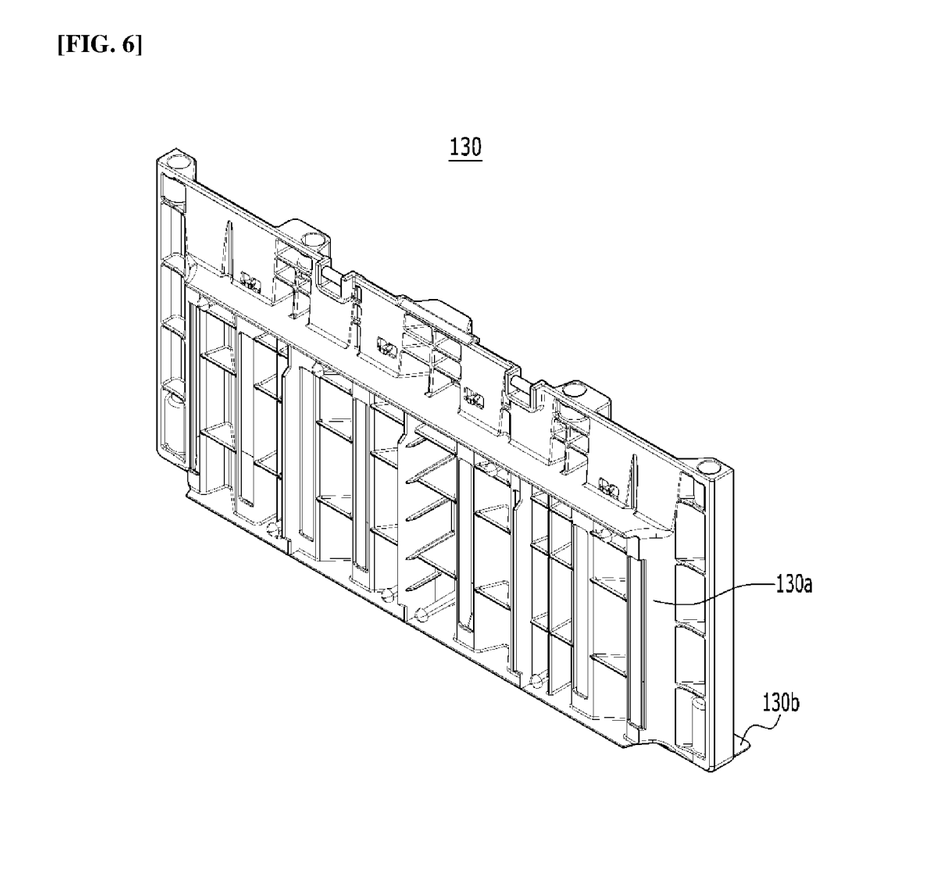
FIG. 6 is a perspective view showing a busbar frame in the battery module of FIG. 2.

FIG. 6 is a perspective view showing a busbar frame in the battery module of FIG. 2.

Referring to FIG. 6, the busbar frame 130 according to the present embodiment includes a main frame 130a disposed perpendicular to a direction in which the electrode leads 111 and 112 described in FIG. 4 protrude, and a bent portion 130b extending from a lower portion of the busbar frame 130. The busbar frame 130 is connected to the battery cell stack 120 as described in FIGS. 2 and 3. The electrode lead may pass through a slit in the main frame 130a to form a structure combined with the busbar. The bent portion 130b may be bent at approximately 90 degrees relative to the main frame 130a and located on the bottom portion 300a of the U-shaped frame 300. The bent portion 130b and its surrounding configuration will be further described with reference to FIG. 7.

Figure 7:
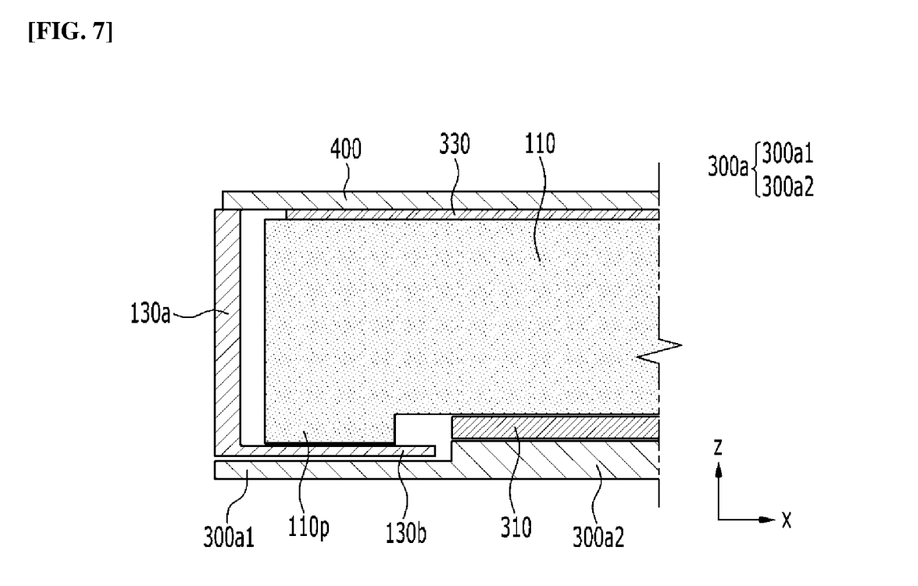
FIG. 7 is a cross-sectional view taken along the XZ plane which is a longitudinal direction of the battery cell stack in FIG. 3.
Figure 8:
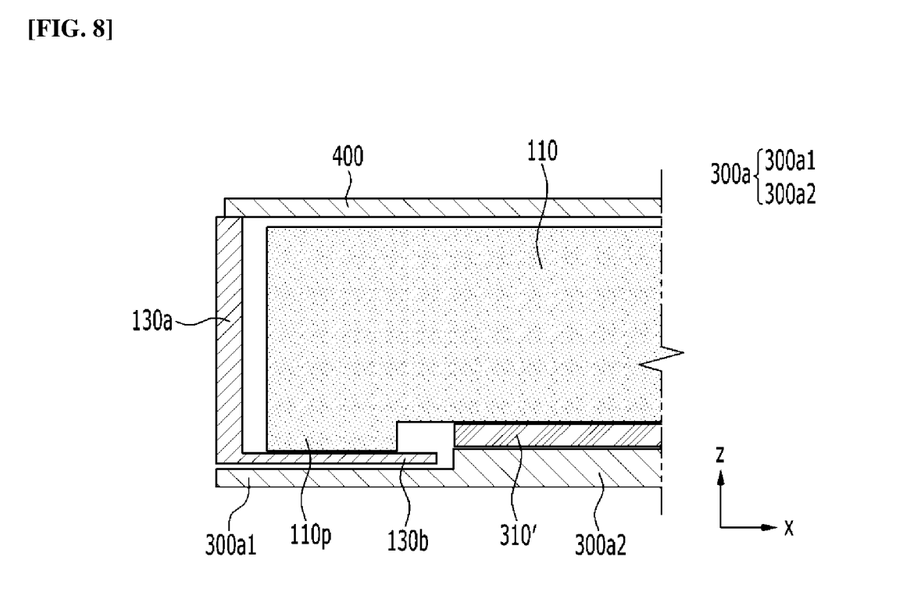
FIG. 8 is a cross-sectional view of a battery module corresponding to the comparative example of FIG. 7.

FIG. 7 is a cross-sectional view taken along the XZ plane which is a longitudinal direction of the battery cell stack in FIG. 3. FIG. 8 is a cross-sectional view of a battery module corresponding to the comparative example of FIG. 7.

Referring to FIG. 7, a battery cell 110 according to the present embodiment includes a protrusion part 110p formed in a width direction, wherein the protrusion part 110p is located on a bent portion 130b. Herein, the width direction of the battery cell 110 may refer to the Z-axis direction of FIG. 7. A bottom portion 300a of the U-shaped frame according to the present embodiment includes a first part 300a1 and a second part 300a2, wherein the first part 300a1 is located at an edge relative to the longitudinal direction of the battery cell 110, and the second part 300a2 is located inside the first part 300a1. In this case, a thickness of the first part 300a1 is preferably thinner than that of the second part 300a2. Herein, the longitudinal direction of the battery cell 110 may refer to the X-axis direction of FIG. 7.

With reference to FIGS. 6 and 7, a bent portion 130b of a busbar frame 130 in the present embodiment is located in the first part 300a1 of the bottom portion 300a of the U-shaped frame. In this case, the total thickness of the bent portion 130b and the first part 300a1 is preferably thinner than the thickness of the second part 300a2. This is because the protrusion part 110p of the battery cell 110 is caught by a step between the first part 300a1 and the second part 300a2 so that it can be prevented from being moved due to an external impact. In addition, it is possible to reduce a gap between the battery cell 110 and the frame through such processing of the bottom portion 300a of the U-shaped frame. This gap reduction causes synergistic effect with a gap reduction that can be obtained through the assembly in a height direction, thereby maximizing the overall space efficiency. The bottom portion 300a of the U-shaped frame may be processed such that a structure of the U-shaped frame is formed together with the step of the bottom portion 300a. Such a step may be formed by a press molding or a NC (numerical control) processing.

A thermally conductive layer 310 is located between the second part 300a2 of the bottom portion 300a and the battery cell 110. According to this embodiment, a structural adhesive layer 330 is located between an upper plate 400 and the battery cell 110. The structural adhesive layer 330 is applied between the upper plate 400 and an upper end of the battery cell stack 120 of FIG. 2 to optimize a shape and an amount of the adhesive.

Referring to FIG. 8, when compared with the embodiment of FIG. 7, a thermally conductive resin is injected or applied between the second part 300a2 of the bottom portion 300a and the battery cell 110 to form a thermally conductive resin layer 310'. The thermally conductive resin layer 310' formed by injecting or applying the thermally conductive resin as described above has problems in productivity and quality control since application and management of an expensive equipment must be accompanied. In addition, excessive injection may be proceeded to simultaneously satisfy a heat transfer and an adhesive strength. In other words, the existing thermally conductive resin layer 310' must have both the thermal conductivity and adhesive strength and be accurately injected/applied to a designated area for the heat transfer performance, but a high load may be accompanied on the injection equipment due to a content of the thermally conductive filler, thereby causing the problems in the productivity and the quality control. In contrast, according to the present embodiment described above, the thermally conductive layer 310 is formed in the portion that requires the heat transfer and the structural adhesive is applied only to a region of a minimum area or more in the portion that requires the adhesive strength, so that the high productivity and the high quality control can be achieved. The thermally conductive layer 310 is formed of a silicon-based thermally conductive paste having a low adhesive performance, a liquid heat radiation material applied to an immersion cooling, or a thermally conductive compression pad so as to facilitate a work.

Hereinafter, an example of a method of manufacturing a battery module according to the present embodiment described above will be explained.

Figure 9:
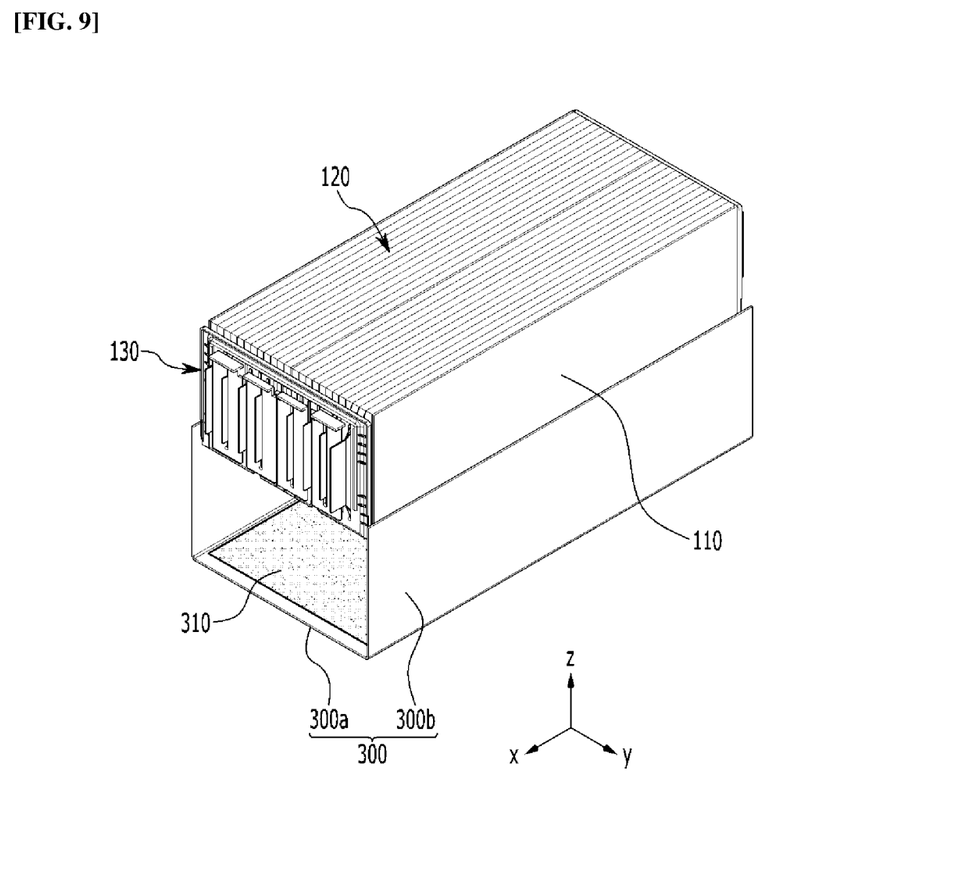
FIGS. 9 to 11 are views showing a process of manufacturing a battery module according to another embodiment of the present disclosure.
Figure 10:
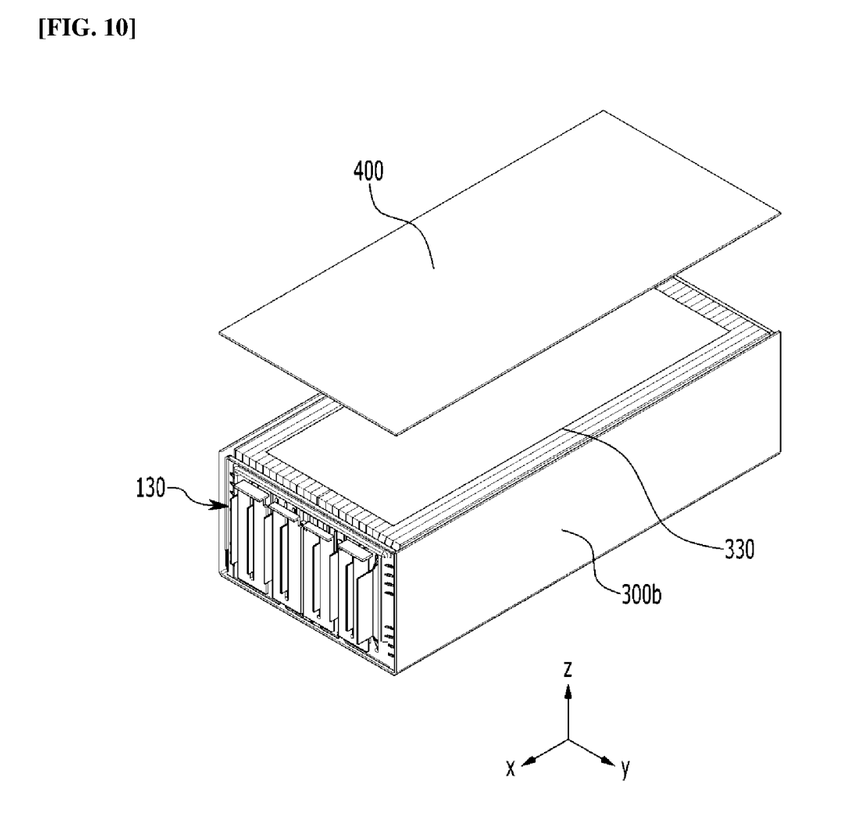
Figure 11:
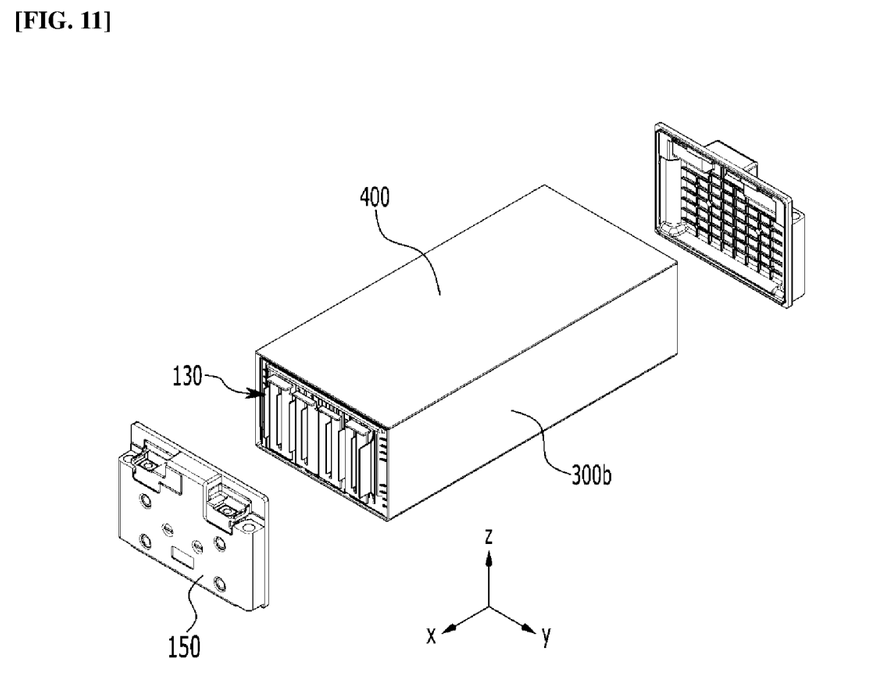

FIGS. 9 to 11 are views showing a method of manufacturing a battery module according to another embodiment of the present disclosure.

Referring to FIG. 9, the method of manufacturing the battery module according to the present embodiment comprises laminating a battery cell stack 120 on a bottom portion 300a of a U-shaped frame 300 having opened upper portion. In this case, the battery cell stack 120 is preferably inserted to the bottom portion 300a of the U-shaped frame 300 in a direction (Z-axis direction) perpendicular to a stacked direction of the plurality of battery cells 110 included in the battery cell stack 120.

The method of manufacturing the battery module according to the present embodiment may further comprise connecting the battery cell stack 120 and a busbar frame 130 while moving the busbar frame 130 in a direction opposite to the direction in which electrode leads of the battery cells 110 protrude, before mounting the battery cell stack 120 on the bottom portion 300a of the U-shaped frame 300. Further, the method of manufacturing the battery module may further comprise forming a thermally conductive layer 310 on the bottom portion 300a of the U-shaped frame 300, before mounting the battery cell stack 120 on the bottom portion 300a of the U-shaped frame 300.

In contrast, a thermally conductive resin layer for transferring a thermal and fixing the battery cell stack may be formed between a lower portion of the battery cell stack 12 and the mono frame 20, as described in FIG. 1. In general, after the battery cell stack 12 is inserted into the mono frame 20, the thermally conductive resin layer is formed by inserting a thermally conductive resin through an injection hole formed in the mono frame 20. However, in case of the above injection method, it is difficult to inject the thermally conductive resin quantitatively due to a clearance of each component in the battery module, and there is a limitation to forming the thermally conductive resin layer having a uniform thickness.

Referring to FIG. 10, the method of manufacturing the battery module according to the present embodiment comprises mounting the upper plate 400 to cover the battery cell stack 120 at an upper portion of the opened U-shaped frame 300. In this embodiment, since the upper plate 400 is coupled to the upper portion of the U-shaped frame 300 in a Z-axis direction, which is a vertical direction, with the manner such as a welding, etc., a protective cover (not shown) necessary for protecting the battery cells 11 may be omitted in the process of inserting the battery cell stack 12 into the mono frame 20 of FIG. 1. According to the present embodiment, the structural adhesive layer 300 may be formed on one surface of the upper plate 400 or on an upper end of the battery cell stack 120 before mounting the upper plate 400.

Referring to FIG. 11, the method of manufacturing the battery module according to the present embodiment comprises coupling the upper plate 400 and the side surface portions 300*b* of the U-shaped frame, and then, coupling the end plates 150 on both the opened sides of the U-shaped frame, respectively. The upper plate 400 and the side surface portions 300*b* of the U-shaped frame can be coupled by using a welding manner, a bonding manner using an adhesive, a bolting fastening manner, a riveting and tape coupling manner, and the like.

Meanwhile, one or more battery modules according to an exemplary embodiment of the present disclosure may be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
110*p*: protrusion part
130*a*: main frame
130*b*: bent portion
150: end plate
300: U-shaped frame
310: thermally conductive layer
330: structural adhesive layer
400: upper plate

The invention claimed is:

1. A battery module comprises:
a battery cell stack in which a plurality of battery cells are stacked,
a U-shaped frame accommodating the battery cell stack and having an opened upper portion,
an upper plate covering the battery cell stack on the opened upper portion of the U-shaped frame,
a thermally conductive layer located between the U-shaped frame and the battery cell stack, and
a structural adhesive layer located between the upper plate and the battery cell stack,
wherein the thermally conductive layer is formed of a silicon-based thermally conductive paste, a liquid heat radiation material, or a thermally conductive compression pad, and the structural adhesive layer is formed of an epoxy-based material,
wherein the thermally conductive layer has a lower adhesive strength than the structural adhesive layer,
wherein the structural adhesive layer is applied on an upper end of the battery cell stack, and one end of each of the plurality battery cells included in the battery cell stack and the upper plate are coupled to each other in a direction perpendicular to a stacked direction of the plurality of battery cells.

2. The battery module according to claim 1, wherein
the U-shaped frame comprises a bottom portion and two side surface portions facing each other,
the bottom portion having two ends based on a longitudinal direction and comprising a first part and a second part, the first part being located at at least one of the two ends and the second part being located inside the first part relative to the two ends, and a thickness of the first part being thinner than that of the second part.

3. The battery module according to claim 2,
further comprising a busbar frame connected to the battery cell stack,
wherein the U-shaped frame is opened at both sides opposite to each other based on a direction in which electrode leads of the battery cell stack protrude, and the busbar frame is connected to the battery cell stack at the opened sides of the U-shaped frame, and
the busbar frame comprises a main frame arranged perpendicular to a direction in which the electrode leads protrude and a bent portion extending from a lower portion of the main frame.

4. The battery module according to claim 3,
wherein the bent portion is located on the first part of the bottom portion.

5. The battery module according to claim 4,
wherein a total thickness of the bent portion and the first part is thinner than a thickness of the second part.

6. The battery module according to claim 5,
wherein the battery cell comprises a protrusion part formed in a width direction, wherein the protrusion part is located on the bent portion.

7. The battery module according to claim 1,
wherein a lower surface of the battery cell stack perpendicular to a stacked direction of the plurality of battery cells is mounted on a bottom portion of the U-shaped frame.

8. The battery module according to claim 1,
further comprising an end plate coupled to each opened side of the U-shaped frame,
the opened both sides of the U-shaped frame facing each other based on a direction in which the electrode leads of the battery cell stack protrude.

9. A battery pack comprising the battery module of claim 1.

10. A method of manufacturing a battery module comprising the steps of:
   forming a thermally conductive layer on a bottom portion of a U-shaped frame having an opened upper portion,
   mounting a battery cell stack such that it is accommodated into the U-shaped frame on the thermally conductive layer,
   applying a structural adhesive layer onto the battery cell stack,
   mounting an upper plate such that it covers the battery cell stack on the opened upper portion of the U-shaped frame, and
   coupling the upper plate and the U-shaped frame,
   wherein the battery cell stack is joined to the upper plate by the structural adhesive layer, and wherein the thermally conductive layer has a lower adhesive strength than the structural adhesive layer.

11. The method of manufacturing the battery module, according to claim 10,
   further comprising coupling an end plate to each opened side of the U-shaped frame,
   wherein the battery cell stack is mounted on the bottom portion of the U-shaped frame while being moved along a direction perpendicular to the bottom portion of the U-shaped frame.

12. The method of manufacturing the battery module, according to claim 11,
   further comprising connecting the battery cell stack and a busbar frame while the busbar frame is moved in a direction opposite to a direction in which electrode leads of the battery cells included in the battery cell stack protrude, before the battery cell stack is mounted on the bottom portion of the U-shaped frame.

13. The method of manufacturing the battery module, according to claim 10,
   wherein the thermally conductive layer is formed of a thermally conductive compression pad.

* * * * *